United States Patent [19]
Oshita

[11] Patent Number: 5,796,441
[45] Date of Patent: Aug. 18, 1998

[54] VIDEO CODING AND DECODING SYSTEM WITH TELETEXT CAPABILITY

[75] Inventor: Shun Oshita, Tokyo, Japan

[73] Assignee: Oki Electric Industry Co., Ltd., Tokyo, Japan

[21] Appl. No.: 623,710

[22] Filed: Mar. 29, 1996

[30] Foreign Application Priority Data

Apr. 27, 1995 [JP] Japan ................................ 7-103392

[51] Int. Cl.[6] .................................................. H04N 7/08
[52] U.S. Cl. ................................... 348/476; 348/845.2
[58] Field of Search ............................... 348/476–479, 348/845, 845.2, 390

[56] References Cited

U.S. PATENT DOCUMENTS 5,438,370 8/1995 Primiano et al. .................. 348/476

Primary Examiner—Victor R. Kostak
Attorney, Agent, or Firm—Rabin & Champagne & Lynt, P.C.

[57] ABSTRACT

A video coding apparatus receives a video signal containing moving-picture information, together with other information present in certain horizontal scanning lines in the vertical blanking intervals. The video coding apparatus compresses the moving-picture information into a compressed digital video data stream, assembles the other information into packets, and multiplexes the packets with the compressed digital video data stream to generate an output signal. A video decoding apparatus demultiplexes this signal to separate the packets from the compressed digital video data stream, decompresses the compressed digital video data, and outputs a video signal having information obtained from the packets in certain horizontal scanning lines in the vertical blanking intervals, and decompressed moving-picture information in other horizontal scanning lines.

24 Claims, 3 Drawing Sheets

VIDEO CODING AND DECODING SYSTEM WITH TELETEXT CAPABILITY

BACKGROUND OF THE INVENTION

The present invention relates to an apparatus for coding and decoding video signals containing information such as teletext in the vertical blanking interval.

Technology for compressively coding and decoding digital video signals is well established. Standards such as MPEG-1, MPEG-2, H.261, and H.320 specify video coding methods that are used in teleconferencing systems and videophones to transmit compressed digital video signals over telephone lines, and in image storage systems to store video data efficiently. MPEG, incidentally, stands for the Motion Picture Experts Group, and all of the standards mentioned above are recommended by the Telecommunication Standardization Sector of the International Telecommunications Union (ITU-T).

Conventional systems implementing the above and other, similar standards often multiplex the coded video signal with an audio signal, and sometimes with a facsimile signal or data signal, permitting facsimile images or computer files to be sent along with the video picture and sound, but these conventional systems ignore the teletext information that can be added to video signals in horizontal scanning lines in the vertical blanking interval. The conventional systems are therefore unable to take advantage of the existing facilities offered by teletext-capable video receivers for displaying text and graphics, and are unable to transmit or store the teletext information contained in many television broadcast signals.

These conventional systems are similarly unable to transmit or store test signals, ghost-cancellation signals, and other such signals occurring in the vertical blanking interval.

SUMMARY OF THE INVENTION

It is accordingly an object of the present invention to enable teletext information to be transmitted and received together with a compressed digital video data signal.

Another object of the invention is to enable teletext information to be stored together with compressed digital video data.

A more general object of the invention is to enable any type of information contained in the vertical blanking interval of a video signal to be transmitted or stored together with compressed digital data encoding the moving-picture information carried by the video signal.

A further object of the invention is to enable a teleconferencing system to display text and graphics on a conventional television monitor of the type equipped to receive and display teletext.

The invented video coding apparatus receives a video signal containing moving-picture information and other information. The other information is present in certain horizontal scanning lines in the vertical blanking intervals of the video signal. The moving-picture information is contained in the horizontal scanning lines not disposed in the vertical blanking intervals.

A compressive encoder encodes the moving-picture information to generate a compressed digital video data stream. The compressive encoder ignores the other information present in the vertical blanking intervals. A packet assembler assembles this other information into packets and adds header information, such as a synchronization pattern and flag information, to each packet. To maintain a constant output rate, the packet assembler may also generate dummy packets. A multiplexer multiplexes these packets with the compressed digital video data stream to generate an output data signal.

In the invented video decoding apparatus, a demultiplexer receives this data signal and separates the packets from the compressed digital video data stream. A packet disassembler inputs the packets, discards the header information, discards dummy packets, and outputs the remaining information as a first video signal, in synchronization with a display synchronizing signal that indicates the timing of horizontal scanning lines and vertical blanking intervals. A decompressive decoder, operating in synchronization with this display synchronizing signal, decodes the compressed digital video data stream to generate a second video signal. A selector, also operating in synchronization with the display synchronizing signal, selects the first video signal during certain horizontal scanning lines in the vertical blanking intervals, and the second video signal during other horizontal scanning lines, thereby generating an output video signal.

DETAILED DESCRIPTION OF THE INVENTION

An embodiment of the invention, comprising a video coding apparatus and a video decoding apparatus, will be described below with reference to the attached illustrative drawings.

Figure 1:
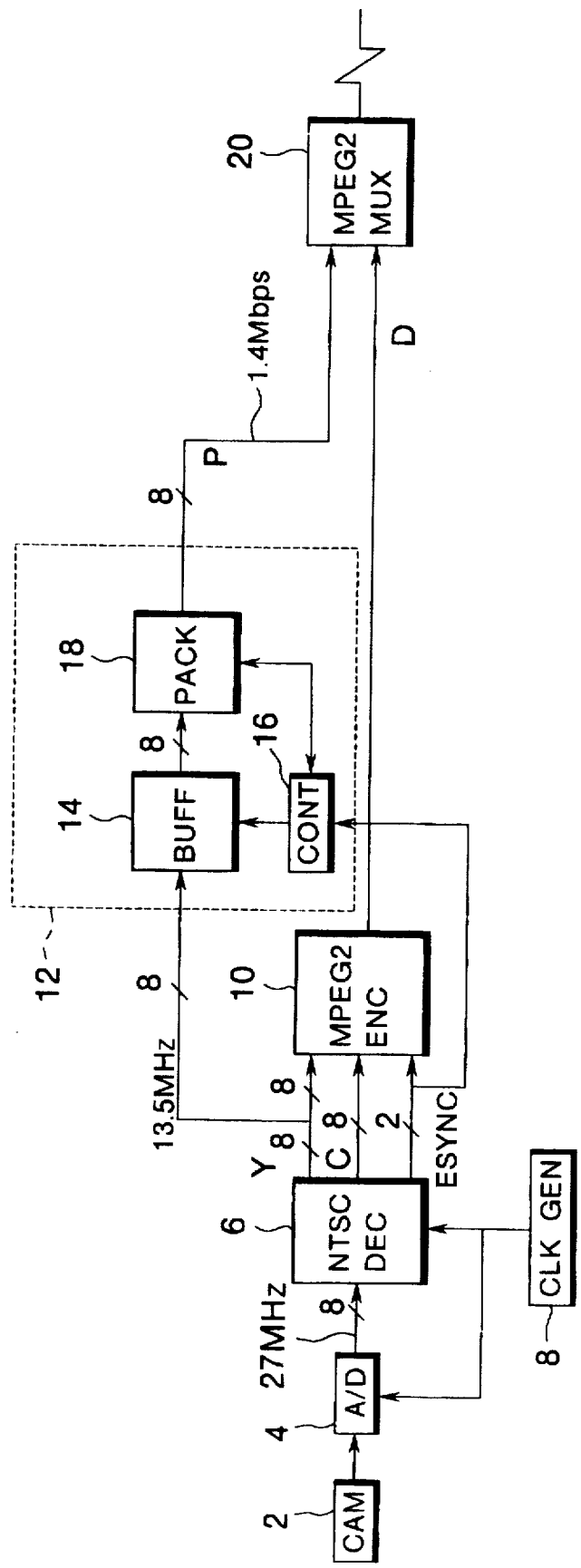
FIG. 1 is a block diagram of the video coding apparatus.

FIG. 1 is a functional block diagram of the video coding apparatus and associated source apparatus. The source apparatus in this case comprises a video camera (CAM) 2 that outputs an analog video signal of the type standardized by the National Television System Committee (NTSC). This signal is sent to an analog-to-digital (A/D) converter 4 and digitized to produce a 27-MHz eight-bit-parallel digital video signal, which is provided to an NTSC decoder (NTSC DEC) 6. The analog-to-digital converter 4 and NTSC decoder 6 both operate in synchronization with a 27-MHz clock signal supplied by a clock generator (CLK GEN) 8.

The exact clock rate differs slightly from 27 MHz. Other clock rates and data rates mentioned below are likewise approximate. In any case, the invention is not limited to any particular clock rates or data rates.

From the output of the analog-to-digital converter 4, the NTSC decoder 6 produces three digital signals: an eight-bit-parallel luminance signal Y, an eight-bit-parallel chrominance signal C consisting of color difference signals Cr and Cb, and a two-bit-parallel synchronizing signal ESYNC. These signals are supplied to an MPEG-2 video encoder (MPEG2 ENC) 10 and a packet assembler 12. The luminance and chrominance signals Y and C have approximate data rates of 13.5 MHz each.

The MPEG-2 video encoder 10 is a compressive encoder that receives all three signals Y, C, and ESYNC, and generates a compressed video data stream D.

The packet assembler 12 comprises a buffer circuit (BUFF) 14, a control circuit (CONT) 16, and a packet packing circuit (PACK) 18. The control circuit 16 receives the synchronizing signal ESYNC and supplies read and write control signals to the buffer circuit 14. The buffer circuit 14 receives the digital luminance signal Y, stores this signal Y in accordance with the write control signals, and outputs the stored signal data to the packet packing circuit 18 in accordance with the read control signals. The packet packing circuit 18 outputs packets P of data.

The compressed digital video data stream D and packets P are received by an MPEG-2 multiplexer (MPEG2 MUX) 20, which multiplexes them to produce an output data signal that can be transmitted over a communication channel or stored in a storage medium. FIG. 1 shows the output data signal being transmitted over a communication channel.

Figure 2:
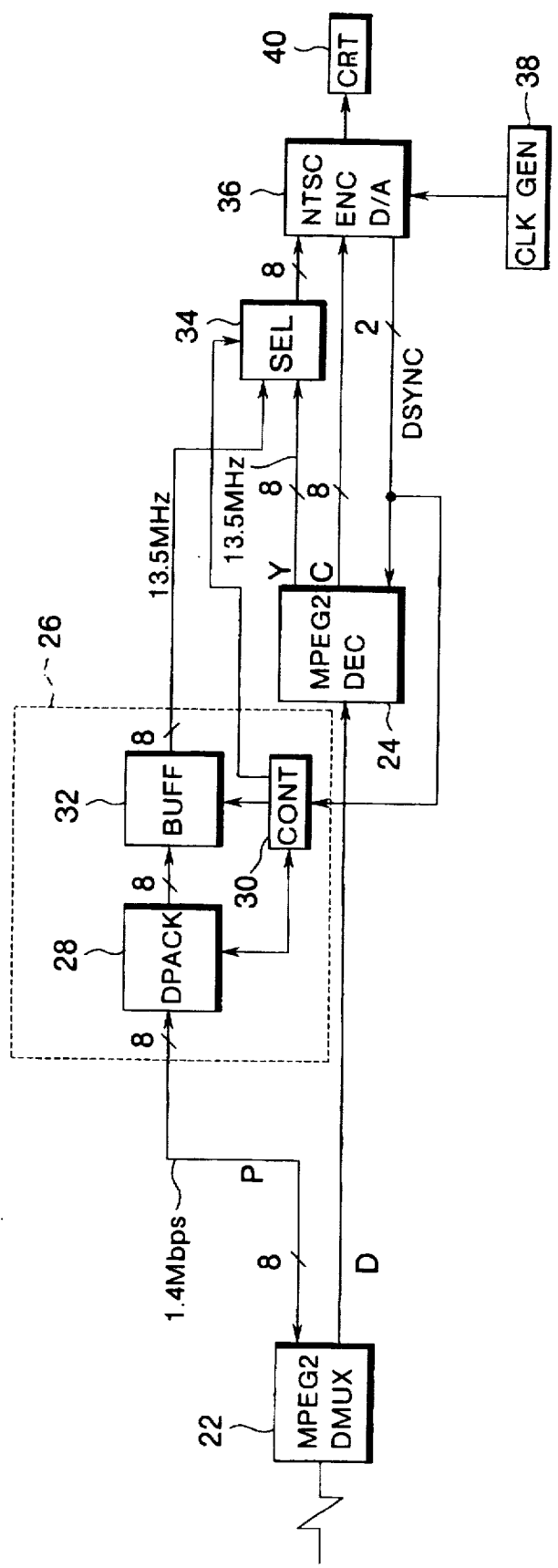
FIG. 2 is a block diagram of the video decoding apparatus.

FIG. 2 is a functional block diagram of the video decoding apparatus and associated display apparatus. In the video decoding apparatus, an MPEG-2 demultiplexer (MPEG2 DMUX) 22 receives the data signal output by the MPEG-2 multiplexer 20 in the video coding apparatus, and separates the compressed digital video data stream D from the packets P. The compressed digital video data stream D is sent to an MPEG-2 video decoder (MPEG2 DEC) 24, which also receives a two-bit-parallel display synchronizing signal DSYNC. The MPEG-2 video decoder 24 is a decompressive decoder that generates, from the compressed digital video data stream D, an eight-bit-parallel luminance signal Y and an eight-bit-parallel chrominance signal C having the same 13.5-MHz data rate and substantially the same content as the luminance and chrominance signals Y and C in the video coding apparatus.

The packets P output by the MPEG-2 demultiplexer 22, and the display synchronizing signal DSYNC, are sent to a packet disassembler 26 comprising a packet unpacking circuit (DPACK) 28, a control circuit (CONT) 30, and a buffer circuit (BUFF) 32. The control circuit 30 generates read, write, and selection control signals from the display synchronizing signal DSYNC. The packet unpacking circuit 28 removes header information from the packets P and sends the remaining eight-bit-parallel data to the buffer circuit 32. The buffer circuit 32 stores the data received from the packet unpacking circuit 28 according to the write control signals received from the control circuit 30, and outputs the data thus stored in accordance with the read control signals, at the same 13.5-MHz rate as the luminance signal Y output by the MPEG-2 decoder 24.

The luminance signal Y from the MPEG-2 decoder 24 and the data signal output from the buffer circuit 32 become inputs to a selector (SEL) 34, which selects one input signal or the other according to the selection control signal from the control circuit 30. The output of the selector 34, and the chrominance signal C output by the MPEG-2 decoder 24, are supplied to an NTSC encoder (NTSC ENC D/A) 36, which also receives a clock signal from a clock generator (CLK GEN) 38. From this clock signal, the NTSC encoder 36 creates the above-mentioned display synchronizing signal DSYNC. The NTSC encoder 36 also combines and encodes the output of the selector 34 and the chrominance signal C to generate an analog NTSC video signal, which is provided to and displayed by a television monitor 40 equipped with, for example, a cathode-ray tube (CRT).

Figure 3:
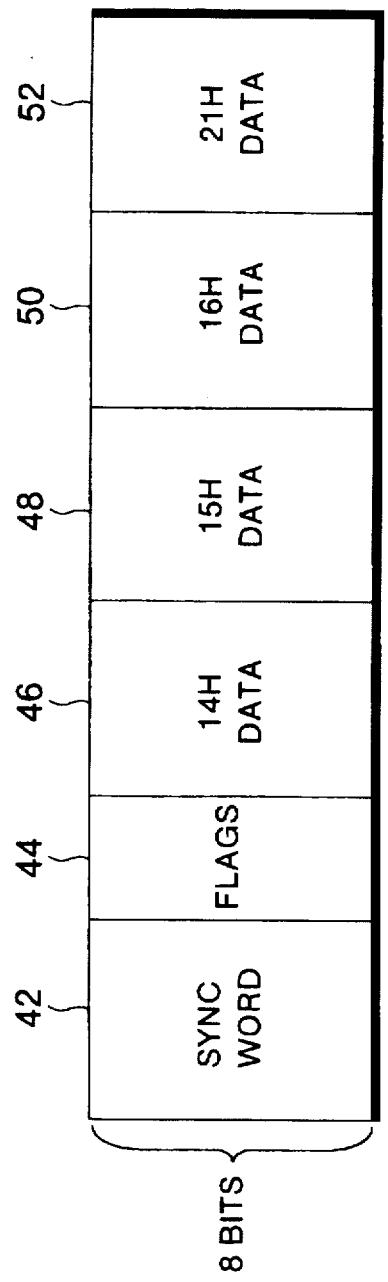
FIG. 3 illustrates a packet format.
Figure 4:
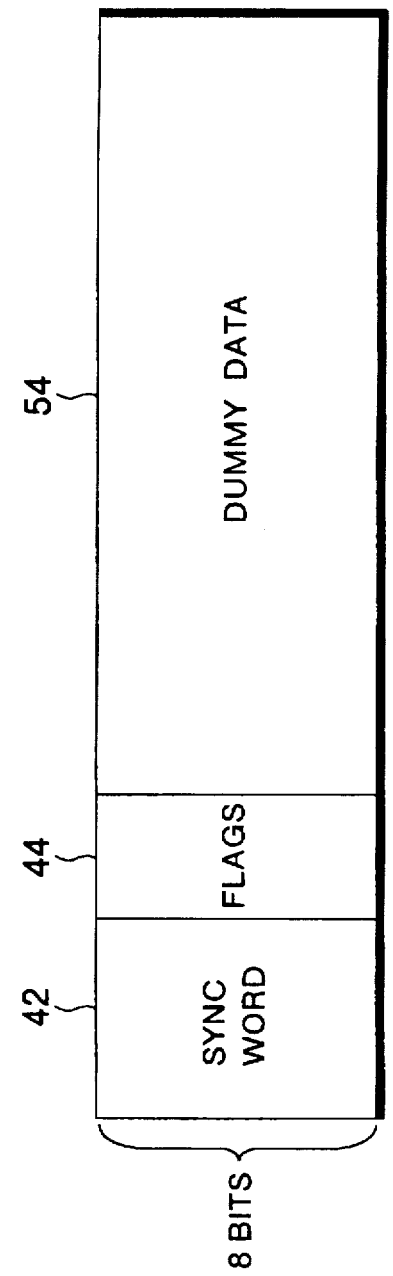
FIG. 4 illustrates another packet format.

FIGS. 3 and 4 show the formats of the packets P. FIG. 3 shows a valid packet; FIG. 4 shows a dummy packet. Both packets begin with a two-byte synchronization pattern or syncword 42, followed by one byte of flag information 44 that identifies the packet type. These three bytes 42 and 44 constitute the header information of the packet. A valid packet continues with four data fields 46, 48, 50, and 52, each containing digital data derived from one horizontal scanning line of the luminance signal Y. For example, the packet in FIG. 3 contains data obtained from the fourteenth, fifteenth, sixteenth, and twenty-first horizontal scanning lines (denoted 14H, 15H, 16H, and 21H) of a video frame. A dummy packet continues with a dummy data field 54, as shown in FIG. 4, equal in length to the combination of the above four data fields 46, 48, 50, and 52, but containing dummy data.

The novel elements in this embodiment are the packet assembler 12 in the coding apparatus and the packet disassembler 26 in the decoding apparatus. These elements can be constructed in various ways. The buffer circuits 14 and 32 function as first-in-first-out (FIFO) memories, so commercially available FIFO memories can be employed, or a general-purpose memory device such as a static random-access memory (SRAM) can be controlled to operate as an FIFO memory. The control circuits 16 and 30 incorporate counters for counting the synchronizing signals ESYNC and DSYNC and logic circuits for generating read, write, and selection control signals responsive to the count values. The packet packing and unpacking circuits 18 and 28 comprise data registers, comparators, and other logic circuits for generating and recognizing syncwords and flag bytes and performing other functions to be described later. The control circuits 16 and 30 and packet packing and unpacking circuits 18 and 28 can be created from gate arrays or programmable logic devices, using techniques familiar to those skilled in the digital electronics art.

The entire packet assembler 12 can also be constructed as a single application-specific integrated circuit, which can be used together with a conventional MPEG-2 encoder and multiplexer to practice the invention. Alternatively, the packet assembler 12 can be combined with the MPEG-2 encoder, or with the MPEG-2 multiplexer, or with both, into a single integrated circuit.

Similarly, the packet disassembler 26 and selector 34 can be constructed as a single application-specific integrated circuit, which can be used together with a conventional MPEG-2 demultiplexer and decoder; or the packet disassembler 26 can be combined with the MPEG-2 decoder, or with the MPEG-2 demultiplexer, or with both, into a single integrated circuit.

The packet assembler 12 or packet disassembler 26 can also be constructed by providing a random-access memory (RAM) for data buffering, a general-purpose microprocessor, and a read-only memory (ROM) for storing a program that the microprocessor executes to carry out the combined functions of the control circuit 16 and packet packing circuit 18 in the coding apparatus, or control circuit 30 and packet unpacking circuit 28 in the decoding apparatus. The microprocessor may be programmed to carry out other functions as well, such as overall control of the coding or decoding apparatus. The microprocessor, RAM, and ROM may be integrated into a single microcontroller device.

In short, the invention can be practiced in many different hardware configurations, and is not limited to just one hardware configuration.

Next the operation of the video coding apparatus will be described. Descriptions of the operation of the analog-to-digital converter 4, NTSC decoder 6, MPEG-2 encoder 10, and MPEG-2 multiplexer 20 will be for the most part omitted, as these circuits are well known.

In the NTSC signal of the present embodiment, the first twenty-one horizontal scanning lines in each field are disposed in the vertical blanking interval. Some of these horizontal scanning lines contain vertical synchronizing pulses and equalizing pulses; other lines may contain test signals, ghost-cancellation signals, or closed-caption signals; still other lines contain teletext information, the transmission of which is an object of the present invention. Teletext information is typically carried in the luminance component of four horizontal scanning lines in each vertical blanking interval, e.g. lines 14H, 15H, 16H, and 21H in the first field and lines 277H, 278H, 279H, and 284H in the second field of each video frame.

The invention is of course not limited to transmitting information in these particular horizontal scanning lines.

Horizontal scanning lines not disposed in the vertical blanking interval contain moving-picture information, which is compressed by the MPEG-2 encoder 10 as described in the MPEG-2 technical specifications. The MPEG-2 encoder 10 ignores the teletext information present in the vertical blanking interval.

In the packet assembler 12, by counting the synchronizing signal ESYNC, the control circuit 16 recognizes the start of each video frame, field, and horizontal scanning line, and determines the line numbers of horizontal scanning lines. During horizontal scanning lines assigned to carry teletext information, the control circuit 16 activates the write control signal, causing the luminance waveforms of these lines to be stored digitally in the buffer circuit 14. The data stored comprise seven hundred twenty samples (each sample having eight data bits) per horizontal scanning line, equivalent to the seven hundred twenty luminance pixels per horizontal scanning line in the moving-picture information.

The packet packing circuit 18 communicates with the control circuit 16 and monitors the status of the buffer circuit 14. At regular intervals, the packet packing circuit 18 generates a syncword 42 and flag information 44. If the buffer circuit 14 contains sufficient valid data, the flag information indicates a valid packet, and the packet packing circuit 18 commands the control circuit 16 to activate the read control signal, causing data stored in the buffer circuit 14 to be read out to the packet packing circuit 18 in first-in-first-out order. In this way the buffer circuit 14 assembles a packet like the one shown in FIG. 3. The packet in FIG. 3 contains the luminance waveform data of horizontal scanning lines 14H, 15H, 16H, and 21H in the vertical blanking interval beginning the first field of a video frame. The next packet output would contain the luminance waveform data of horizontal scanning lines 277H, 278H, 279H, and 284H in the vertical blanking interval beginning the second field of the same video frame.

If the buffer circuit 14 does not contain enough valid data for a valid packet, the packet packing circuit 18 generates dummy data, such as all-zero data or all-one data, and outputs a packet like the one in FIG. 4, while the control circuit 16 leaves the read control signal inactive. By generating dummy packets as necessary, the packet packing circuit 18 is able to deliver packets P to the MPEG-2 multiplexer 20 at a steady data rate of substantially 1.4 megabits per second (1.4 Mbps).

The MPEG-2 multiplexer 20 has a user interface at which it can receive arbitrary user data; the packets P are supplied to this interface. The MPEG-2 multiplexer 20 multiplexes these packets P together with the compressed digital video data stream D received from the MPEG-2 encoder 10, as described in the MPEG-2 technical specifications, to create the output data signal sent via a communication channel, for example, to the decoding apparatus.

Next the operation of the video decoding apparatus will be described. Descriptions of the operation of the MPEG-2 demultiplexer 22, MPEG-2 decoder 24, and NTSC encoder 36 will be largely omitted, as these circuits are also well known.

The MPEG-2 demultiplexer 22 demultiplexes the arriving signal to separate the packets P from the compressed digital video data stream D. The MPEG-2 demultiplexer 22 has a user interface through which it sends the packets P to the packet disassembler 26. The compressed digital video data stream D is sent to the MPEG-2 decoder 24 and decoded according to the MPEG-2 technical specifications.

The packet unpacking circuit 28 examines the flag information 44 in each incoming packet P to determine whether the packet is a dummy packet or contains valid data. Dummy packets are discarded, while valid packets are stripped of their header information, then stored in the buffer circuit 32. In FIG. 3, the contents of the data fields 46, 48, 50, and 52 are stored in the buffer circuit 32; the syncword 42 and flag information 44 are discarded. In FIG. 4, the entire packet is discarded, because it contains dummy data. The control circuit 30 generates the necessary write control signals in response to commands from the packet unpacking circuit 28.

Operation of the video decoding apparatus is synchronized with the synchronizing signal DSYNC which, like the synchronizing signal ESYNC in the coder, indicates the start of each video frame, field, and horizontal scanning line. By counting this synchronizing signal DSYNC, the control circuit 30 determines the horizontal scanning lines which are assigned to carry teletext information in the vertical blanking intervals. During these horizontal scanning lines, the control circuit 30 activates the read control signal to have the data that was stored in the buffer circuit 32 read out to the selector 34, in first-in-first-out order, at a rate of 13.5 MHz, and activates the selection control signal so that the selector 34 selects these data. During other horizontal scanning lines the control circuit 30 deactivates the read control and selection control signals, so that no data are read out of the buffer circuit 32 and the selector 34 selects the luminance signal Y from the MPEG-2 decoder.

Normally, the horizontal scanning lines during which the read control and selection control signals in the video decoding apparatus are active will be the same as the horizontal scanning lines during which the write control signal was active in the video coding apparatus, e.g. lines 14H, 15H, 16H, 21H, 277H, 278H, 279H, and 284H of each video frame. This is not a necessary condition, however; teletext signals present on certain horizontal scanning lines in the source signal input to the video coding apparatus can be moved to other horizontal scanning lines in the video signal output by the video decoding apparatus.

By receiving the output of the selector 34 as a luminance signal and receiving the chrominance signal C output by the MPEG-2 decoder, the NTSC encoder 36 is able to generate a video signal containing both the moving-picture information compressed and decompressed by the MPEG-2 encoder 10 and decoder 24, and the teletext information that was packed and unpacked by the packet packing circuit 18 and packet unpacking circuit 28 and transmitted as packets P of user data. The NTSC encoder 36 includes a digital-to-analog (D/A) converter that converts this video signal from digital to analog form for output to the television monitor 40.

The television monitor 40 includes not only circuits for displaying a standard analog NTSC picture signal but also circuits for receiving and displaying teletext. By operating controls on the television monitor 40, the viewer can choose whether to display a moving video picture or pages of teletext. The teletext information, incidentally, is not restricted to text: teletext may also include graphics.

In video teleconferencing there are many occasions when the participants wish to discuss schedules, financial figures, business charts, engineering data, or other information that can be best displayed as text or graphics. Some existing teleconferencing systems provide for the multiplexing of such information as facsimile data or computer files together with the compressed video data stream, but viewing the information then requires a separate facsimile machine or computer display. The present invention enables text or graphics to be displayed on the same television monitor 40 as the moving-picture video signal, which is more convenient to the user.

The invention also saves money. Instead of requiring a facsimile machine or computer, the invented system requires only the addition of the packet assembler 12 to a conventional video coding apparatus, and the addition of the packet disassembler 26 and selector 34 to a conventional video decoding apparatus. As described earlier, the packet assembler 12 and disassembler 26 can consist of as few as one integrated circuit each, or can even be integrated into other integrated circuits of the apparatus.

Similar benefits are obtained in videophone systems.

In image storage systems, the invention enables teletext information to be stored together with compressed video data, then reproduced on a conventional television monitor 40 equipped for teletext reception. This feature is useful in, for example, the archiving of television broadcasts that contain teletext.

The invention is not limited to the embodiment shown in the drawings. Some examples of the many possible variations are as follows.

Instead of an MPEG-2 encoder and decoder, the invention can employ an encoder and decoder conforming to other standards such as MPEG-1, H.261, H.320, or in general any compressive encoder and decompressive decoder. If a suitable multiplexer and demultiplexer with a user interface are not already available, they can easily be designed and manufactured.

No restriction is placed on the format of the compressed video data stream D. The data D may be organized into packets, words, frames, or any other units.

The packet format of the packets P is not limited to the format shown in FIGS. 3 and 4. The format may also include a check code or error-correcting code for error control, for example.

The multiplexer and demultiplexer may multiplex and demultiplex other signals in addition to the compressed video data stream D and packets P. These other signals might include, for example, a compressed audio signal, text data other than teletext, and facsimile signals or computer files as mentioned above.

The video source does not have to be a video camera. The source equipment may be a television receiver, a video tape recorder or cassette recorder, or any other device producing a video signal.

The invention is not restricted to NTSC source signals. The source signal may be another type of composite video signal (PAL or SECAM), or an S-video signal in which luminance and chrominance signals are supplied separately, or a signal in the common intermediate format (CIF).

The horizontal scanning lines containing the teletext information are not restricted to four lines per vertical blanking interval; there may be more or fewer than four lines.

The invention is not limited to video signals containing teletext. Video signals containing videotex information (interactive teletext) can be processed in the same way. The term teletext should be understood as covering videotex and all other such systems that transmit text or graphics during the vertical blanking interval of a video signal.

The invention can also be used to transmit the test signals or ghost-cancellation signals mentioned above, or in general to transmit any information contained in the vertical blanking interval which is ignored by conventional video coding and decoding apparatus.

The packet assembler does not necessarily have to generate dummy packets; it may generate and output only valid packets.

The packets output by the packet assembler need not simply contain the digitized waveforms of the relevant horizontal scanning lines. This scheme has the virtues of simplicity and of being applicable to any type of information contained in the vertical blanking interval, but in many teletext systems, the information represents sequences of character codes, formatting codes, graphic-drawing command codes, and the like. The packet assembler may be adapted to reduce the waveforms to these codes, thereby achieving a lower data rate. The packet disassembler can then be adapted to reconstruct the waveforms from the received codes.

Those skilled in the art will recognize that further modifications are possible within the scope of the invention as claimed below.

What is claimed is:

1. A method of coding and decoding a video signal containing moving-picture information in horizontal scanning lines not disposed in vertical blanking intervals, and containing other information in certain first horizontal scanning lines disposed in said vertical blanking intervals, comprising the steps of:

converting said video signal into a digital video signal in which at least a digitized luminance signal and a digitized chrominance signal are separately present;

compressively coding the moving-picture information in said digital video signal to generate a compressed digital video data stream;

assembling said other information from said digitized luminance signal into packets;

multiplexing said packets with said compressed digital video data stream to generate a data signal;

demultiplexing said data signal to separate said packets from said compressed digital video data stream;

generating a display synchronizing signal indicating timings of horizontal scanning lines and vertical blanking intervals;

disassembling said packets to generate a first video signal having said other information in certain second horizontal scanning lines disposed in the vertical blanking intervals indicated by said display synchronizing signal;

decoding said compressed digital video data to generate a second video signal having moving-picture information in horizontal scanning lines not disposed in the vertical blanking intervals indicated by said display synchronizing signal;

selecting said first video signal during said second horizontal scanning lines;

selecting said second video signal during horizontal scanning lines other than said second horizontal scanning lines; and combining the first video signal when thus selected and the second video signal when thus selected to produce an output video signal.

2. The method of claim 1, wherein said other information is teletext information.

3. The method of claim 2, comprising the further step of supplying said output video signal to a television monitor equipped to receive and display teletext information.

4. The method of claim 1, wherein said packets contain digitized waveforms of said first horizontal scanning lines.

5. The method of claim 1, wherein said step of assembling comprises:

storing said other information in a first-in-first-out buffer;

generating header information;

reading a certain amount of said other information from said first-in-first-out buffer; and outputting said header information and said certain amount of other information as a packet.

6. The method of claim 5 wherein, if said certain amount of said other information is not available in said first-in-first-out buffer, said certain amount of said other information is replaced in said packet with dummy information, thereby creating a dummy packet.

7. The method of claim 6, wherein said header information comprises:

a synchronization pattern; and flag information indicating whether said packet is a dummy packet.

8. A video coding apparatus for coding a video signal that has vertical blanking intervals, contains moving-picture information in horizontal scanning lines not disposed in said vertical blanking intervals, and contains other information in certain horizontal scanning lines disposed in said vertical blanking intervals, comprising:

a video signal decoder for converting said video signal into a digital video signal in which at least a digitized luminance signal and a digitized chrominance signal are separately present;

a compressive encoder for generating a compressed digital video data stream from the moving-picture information in said digitized luminance signal;

a packet assembler for taking said other information from the digitized luminance signal in said certain horizontal scanning lines in said vertical blanking intervals and assembling said other information into packets; and a multiplexer coupled to said compressive encoder and said packet assembler, for combining said packets with said compressed digital video data stream to generate an output data signal.

9. The video decoding apparatus of claim 8, wherein said other information is teletext information.

10. The video coding apparatus of claim 8, wherein said compressive encoder and said multiplexer conform to MPEG-2 technical specifications.

11. The video coding apparatus of claim 8, wherein said packet assembler comprises:

a buffer circuit for receiving and storing said other information;

a control circuit coupled to said buffer circuit, for counting horizontal scanning lines and generating read control signals and write control signals for said buffer circuit; and a packet packing circuit for reading a certain amount of said other information from said buffer circuit, generating header information, and outputting said certain amount of said other information and said header information as a packet.

12. The video coding apparatus of claim 11, wherein said buffer circuit receives and stores digitized waveforms of said certain horizontal scanning lines.

13. The video coding apparatus of claim 11, wherein said header information comprises a synchronization pattern and flag information.

14. The video decoding apparatus of claim 13 wherein, when said certain amount of said other information is not present in said buffer circuit, said packet packing circuit outputs a dummy packet comprising said header information and dummy information, and identifies said dummy packet by the flag information in said header information.

15. A video decoding apparatus for decoding a multiplexed data signal, containing both compressed digital video data and packets of other information, to generate an output video signal synchronized with a display synchronizing signal indicating timings of horizontal scanning lines, comprising:

a demultiplexer for receiving said multiplexed data signal and separating said compressed digital video data from said packets of other information;

a packet disassembler coupled to said demultiplexer, for receiving said packets of other information and disassembling said packets of other information to generate a first luminance signal;

a decompressive decoder coupled to said demultiplexer, for receiving said compressed digital video data and decoding said compressed digital video data to generate a second video luminance signal and a chrominance signal;

a selector coupled to said decompressive decoder and said packet disassembler, for selecting said first luminance signal during certain horizontal scanning lines among said horizontal scanning lines, and selecting said second luminance signal during horizontal scanning lines other than said certain horizontal scanning lines; and an encoder for combining said chrominance signal with the luminance signal selected by said selector, thereby producing said output video signal.

16. The video decoding apparatus of claim 15, wherein said certain horizontal scanning lines are disposed in vertical blanking intervals of said output video signal.

17. The video decoding apparatus of claim 15, wherein said other information comprises digitized waveforms of said certain horizontal scanning lines.

18. The video decoding apparatus of claim 15, wherein said other information is teletext information.

19. The video coding apparatus of claim 15, wherein said demultiplexer and said decompressive decoder conform to MPEG-2 technical specifications.

20. The video decoding apparatus of claim 15, wherein each packet among said packets comprises header information in addition to said other information.

21. The video decoding apparatus of claim 20, wherein said packet disassembler comprises:

a packet unpacking circuit for receiving said packets, discarding said header information, and outputting said other information;

a buffer circuit coupled to said packet unpacking circuit and said selector, for storing the other information not discarded by said packet unpacking circuit; and a control circuit coupled to said buffer circuit, for counting the horizontal scanning lines indicated by said display synchronizing signal, generating read control signals and write control signals for said buffer circuit, and generating selection control signals for said selector, said read control signals causing said other information stored in said buffer circuit to be read out to said selector during said certain horizontal scanning lines, and said selection control signals causing said selector to select said other information during said certain horizontal scanning lines.

22. The video decoding apparatus of claim 21, wherein said header information comprises a synchronization pattern and flag information, said flag information indicating whether said other information is valid.

23. The video decoding apparatus of claim 22, wherein said packet unpacking circuit discards said other information when said flag information indicates that said other information is not valid.

24. The method of claim 1, wherein said luminance signal is a multiple-bit-parallel signal, and said chrominance signal is another multiple-bit-parallel signal.

* * * * *